(12) United States Patent
Chambron et al.

(10) Patent No.: US 10,012,434 B2
(45) Date of Patent: Jul. 3, 2018

(54) METHOD AND APPARATUS FOR PRODUCING CARBON DIOXIDE AND HYDROGEN

(71) Applicant: L'Air Liquide, Societe Anonyme pour l'Etude et l'Exploitation des Procedes Georges Claude, Paris (FR)

(72) Inventors: Nicolas Chambron, Nogent sur Marne (FR); Richard Dubettier-Grenier, La Varenne Saint Hilaire (FR); Sylvain Gerard, Saint-Cloud (FR)

(73) Assignee: L'AIR LIQUIDE SOCIETE ANONYME POUR L'ETUDE ET L'EXPLOITATION DES PROCEDES GEORGES CLAUDE, Paris (FR)

( * ) Notice: Subject to any disclaimer, the term of this patent is extended or adjusted under 35 U.S.C. 154(b) by 450 days.

(21) Appl. No.: 14/773,615

(22) PCT Filed: Feb. 11, 2014

(86) PCT No.: PCT/FR2014/050259
§ 371 (c)(1),
(2) Date: Sep. 8, 2015

(87) PCT Pub. No.: WO2014/135756
PCT Pub. Date: Sep. 12, 2014

(65) Prior Publication Data
US 2016/0131423 A1     May 12, 2016

(30) Foreign Application Priority Data

Mar. 8, 2013 (FR) .................................... 13 52121

(51) Int. Cl.
*F25J 3/02* (2006.01)
*C01B 3/50* (2006.01)
(Continued)

(52) U.S. Cl.
CPC .......... *F25J 3/0219* (2013.01); *B01D 53/047* (2013.01); *B01D 53/261* (2013.01); *C01B 3/506* (2013.01);
(Continued)

(58) Field of Classification Search
CPC .............. C01B 3/506; C01B 2203/042; C01B 2203/043; C01B 2203/0475;
(Continued)

(56) References Cited

U.S. PATENT DOCUMENTS 3,417,572 A * 12/1968 Pryor .................... C01B 17/167
62/634
4,371,381 A * 2/1983 Schuftan ................. C01B 3/506
62/630

(Continued)

FOREIGN PATENT DOCUMENTS

| EP | 2 149 769 | 2/2010 |
|----|-----------|--------|
| FR | 2 971 044 | 8/2012 |
| GB | 2 490 476 | 11/2012 |

OTHER PUBLICATIONS

International Search Report and Written Opinion for PCT/FR2014/050259, dated Mar. 19, 2014.

(Continued)

*Primary Examiner* — Timothy C Vanoy
(74) *Attorney, Agent, or Firm* — Justin K. Murray (57) ABSTRACT

In a process for the production of carbon dioxide and hydrogen from a gas flow comprising at least hydrogen, at least one sulfur-comprising component and carbon dioxide originating from a Claus unit fed with a gas comprising at least 50 mol % of oxygen, the gas flow is compressed and dried in order to produce a compressed and dried gas flow and the compressed and dried gas flow is separated at a subambient temperature in order to produce at least a fluid (Continued)

enriched in carbon dioxide with respect to the compressed and dried gas flow and at least a fluid enriched in hydrogen with respect to the compressed and dried gas flow.

14 Claims, 3 Drawing Sheets

(51) Int. Cl.
 *B01D 53/047* (2006.01)
 *B01D 53/26* (2006.01)
(52) U.S. Cl.
 CPC ............ *C01B 3/508* (2013.01); *F25J 3/0252* (2013.01); *F25J 3/0266* (2013.01); *B01D 2256/16* (2013.01); *B01D 2256/22* (2013.01); *B01D 2257/30* (2013.01); *B01D 2257/80* (2013.01); *C01B 2203/042* (2013.01); *C01B 2203/043* (2013.01); *C01B 2203/0475* (2013.01); *C01B 2203/0485* (2013.01)

(58) Field of Classification Search
 CPC ................ C01B 2203/0485; C01B 3/508; F25J 3/0219; F25J 3/0266; F25J 3/0252; B01D 2257/80; B01D 2257/30; B01D 2256/16; B01D 53/261; B01D 53/047; B01D 2256/22
 See application file for complete search history.

(56) References Cited

U.S. PATENT DOCUMENTS

| | | | |
|---|---|---|---|
| 4,952,223 A | | 8/1990 | Kirshnamurthy et al. |
| 2008/0196584 A1 | | 8/2008 | Ha |
| 2012/0027656 A1 | * | 2/2012 | Schaffer .............. B01D 53/047 423/222 |
| 2013/0125756 A1 | * | 5/2013 | Hufton ................ B01D 53/047 96/130 |

OTHER PUBLICATIONS

French Search Report and Written Opinion for FR 1 352 121, dated Oct. 7, 2013.

* cited by examiner

METHOD AND APPARATUS FOR PRODUCING CARBON DIOXIDE AND HYDROGEN

CROSS REFERENCE TO RELATED APPLICATIONS

This application is a § 371 of International PCT Application PCT/FR2014/050259, filed Feb. 11, 2014, which claims the benefit of FR1352121, filed Mar. 8, 2013, both of which are herein incorporated by reference in their entireties.

TECHNICAL FIELD OF THE INVENTION

The present invention relates to a process and device for the production of carbon dioxide and hydrogen.

BACKGROUND

It is known to treat a hydrocarbon flow in order to remove sulfur-comprising components and carbon dioxide. The hydrocarbon flow can, for example, be natural gas or a gas resulting from an oil refinery.

The industries for the production of oil or natural gas or for the refining of oil produce sour gases rich in $CO_2$ and in sulfur-comprising compounds (mainly $H_2S$) which have to be treated before being able to be released to the atmosphere.

A common process for treating these sour gases is the Claus process, in which hydrogen sulfide ($H_2S$) is partially converted into sulfur dioxide ($SO_2$) by combustion in the air in a furnace:

$$2H_2S + 3O_2 \rightarrow 2SO_2 + 2H_2O$$

At the outlet of the Claus furnace, the stoichiometric proportions of $H_2S$ and of $SO_2$ make possible the Claus reaction; this reaction takes place in several catalytic reactors:

$$2H_2S + SO_2 \leftrightarrow 3S + 2H_2O$$

To sum up, the Claus process converts hydrogen sulfide into elemental sulfur by combustion and catalytic reaction.

A known improvement to the Claus process is the replacement of air by an oxygen-rich gas (comprising between 50 mol % and 99.8 mol % of oxygen), which makes it possible to obtain flue gases more concentrated in $CO_2$ (not diluted by atmospheric nitrogen) and to make possible the purification of these flue gases.

The traces of $H_2S$ present in the effluent stream from the Claus unit (the tail gases) can be treated by a unit known as a TGT (Tail Gas Treatment) unit, where the effluent stream from the Claus unit is treated by absorption with a solvent in order to reduce its content of sulfur-comprising components, such as $CO_2$ and/or $H_2S$.

At the outlet of the TGT unit, the effluent stream depleted in $H_2S$ comprises mainly $CO_2$, and hydrogen generated during the stages of purification of the tail gases. A typical composition can be between 50 mol % and 90 mol % of $CO_2$ and between 5 mol % and 30 mol % of hydrogen.

The flue gases from a conventional Claus unit (with combustion in the air) can be treated by units for separation by amines (of MEA or MDEA type). These units make it possible to obtain a pure $CO_2$ stream (>99% of $CO_2$ in general).

The disadvantages of the units for absorption by solution of amines are the high operating costs, by virtue of the strong need for steam for the regeneration of a $CO_2$-laden solvent and the gradual deterioration in the solvent, which requires a constant supply. The capital cost is also high. Beyond the economic aspect, the risks of emissions and of toxicity of these solvents require very restrictive operating procedures.

An alternative solution is the treatment of the effluent streams from the Claus/TGT units fed with oxygen by a membrane separation unit where a stream rich in $CO_2$ is produced in the residue (high-pressure side of the membrane) and a stream depleted in $CO_2$ is produced in the permeate (low-pressure side of the membrane), this permeate being recycled to the Claus furnace in order to dilute the reaction gases and to control the temperature within the furnace. This is because the use of pure oxygen in the place of air requires the addition of a gas ballast (role of nitrogen for air) which will absorb the energy of the combustion reaction and limit the rise in the temperature within the furnace.

The disadvantages of this solution are as follows:
- presence of $H_2$ (from 25 to 35 mol %) in the permeate: the recycling of the permeate to the combustion furnace generates additional exothermicity by the combustion of the hydrogen, whereas the role of the ballast is to capture a portion of the energy of the oxidation reaction of the hydrogen sulfide,
- the recycling of the permeate (comprising from 65 to 75 mol % of $CO_2$) has the effect of enlarging the Claus unit and all the downstream units,
- the $CO_2$ produced has a purity limited to 98%,
- the recovery yield is of the order of 80% without considering the recycling of the permeate; by recycling the permeate, the $CO_2$ recovery can reach up to 100% results in the enlarging of the Claus/TGT unit and of all the downstream units (compression, drying, membranes),
- it is difficult to recover in value economically the $H_2$ present in the flue gases (the permeate is too depleted in hydrogen and furthermore at low pressure).

SUMMARY OF THE INVENTION

Embodiments of the present invention provide for the purification of the flue gases from the Claus unit, operating with enriched oxygen, optionally followed by a TGT unit, by the subambient temperature route in order to produce a stream of pure $CO_2$ and a hydrogen-rich stream; the methods for the purification of this hydrogen-rich stream are also described.

As in the case of the membrane-route solution described above, the use of purified oxygen at the inlet of the Claus unit and not of air, like the conventional Claus units, makes it possible to obtain a stream highly enriched in $CO_2$ at the outlet of the TGT unit and to render very favorable the purification of the $CO_2$ by the subambient temperature route.

The flue gases at the outlet of the TGT unit, downstream of a Claus unit fed with an oxidizing gas comprising at least 95 mol % of oxygen, have a mean composition of 85 mol % of $CO_2$, 8 mol % of hydrogen, 7 mol % of water, 100 ppmv of $H_2S$ and 40 ppmv of COS.

These flue gases, produced at low pressure (~1.05 bar abs), are compressed up to approximately 20 bar abs (preferably between 15 and 60 bar abs) and then dried by a cyclic adsorption process (TSA type). In order not to damage the recovery yield of the $CO_2$, the adsorbers are regenerated at the same pressure as the adsorption stage by a portion of the dry stream exiting from the adsorber in production, and the regeneration stream exiting from the adsorber in regeneration is cooled in order to condense the water and then the gas phase separated from the water is reintroduced in the compression stage. In an alternative form of the invention, the adsorbers can be regenerated by the stream of noncondensable products from the separation at subambient temperature. The stage of drying by adsorption can be placed at the outlet of the compression stage or within this stage (as compressor interstage).

The compressed and dried flue gases are cooled to a temperature as close as possible to the triple point of $CO_2$ (i.e., −56.5° C.) and more particularly of the order of −51° C. by countercurrentwise exchange with a portion of the $CO_2$ produced and reduced in pressure. The compressed and cooled flue gases are condensed and separated by distillation at subambient temperature and/or by condensation and sending into phase separator(s) to give a liquid phase rich in $CO_2$ (>99.5 mol %) and a gas phase rich in hydrogen (>60 mol %). The $CO_2$ produced is partially reduced in pressure to generate the cold necessary for the process before being compressed to the final pressure of use (for example, EOR, EGR, and the like). The stream enriched in hydrogen is made use of economically in a unit other than the Claus and TGT units.

The present invention relates to a device and a method for the purification of the flue gases from Claus and optionally TGT units for the recovery of the $CO_2$ and of the hydrogen which are present.

According to a subject matter of the invention, a process is provided for the production of carbon dioxide and hydrogen from a gas flow comprising at least hydrogen, at least one sulfur-comprising component and carbon dioxide originating from a Claus unit in which hydrogen sulfide ($H_2S$) is partially converted into sulfur, the Claus unit being fed with a gas comprising at least 50 mol % of oxygen, in which:

a) the gas flow is compressed and dried in order to produce a compressed and dried gas flow, and b) the compressed and dried gas flow is separated by distillation and/or by at least one stage of partial condensation at a subambient temperature, in order to produce at least a fluid enriched in carbon dioxide with respect to the compressed and dried gas flow and at least a fluid enriched in hydrogen with respect to the compressed and dried gas flow.

According to other optional characteristics:
 the fluid enriched in hydrogen is a gas and this gas or a gas derived from this gas is separated by adsorption in order to produce a flow rich in hydrogen comprising at least 60 mol % of hydrogen and a flow depleted in hydrogen,
 the flow rich in hydrogen comprises at least 90 mol % of hydrogen,
 the flow depleted in hydrogen comprises carbon dioxide and is treated by separation at subambient temperature in order to produce a flow rich in carbon dioxide,
 the fluid enriched in hydrogen comprises at least one sulfur-comprising component and is separated by adsorption in order to produce a flow depleted in at least one sulfur-comprising component,
 the fluid enriched in hydrogen or a gas derived from this gas is separated by distillation and/or by at least one stage of partial condensation at a subambient temperature, optionally fed with another flow rich in hydrogen not originating from the separation at subambient temperature,
 the fluid enriched in hydrogen is separated by permeation in order to produce a gas rich in hydrogen and a gas comprising carbon dioxide,
 the gas comprising carbon dioxide comprises at least 40% of carbon dioxide and is returned to the separation at subambient temperature,
 the gas flow originating from the Claus unit is not treated by a stage of absorption with a solvent or by combustion with oxygen before stage a),
 the gas flow originates directly from the Claus unit, without having been treated in order to reduce its content of sulfur-comprising compounds, optionally otherwise than by drying,
 the gas flow to be separated in the separation unit at subambient temperature comprises $H_2S$ and/or COS,
 the gas flow to be separated in the separation unit comprises at least 1%, indeed even 2%, of $H_2S$,
 the fluid rich in carbon dioxide produced by the separation unit at subambient temperature comprises at least 2% of $H_2S$ and optionally at least 90% of $CO_2$,
 the gas flow is treated in order to reduce its content of carbon dioxide upstream of the compression,
 the gas flow comprises at least one nitrogenous compound,
 the stage of separation at subambient temperature is thermally integrated with a process for the treatment of a fluid comprising a stage at subambient temperature, the treatment process being intended to produce a fluid intended for the Claus unit,
 the fluid enriched in hydrogen comprises at least 50 mol % of hydrogen, indeed even at least 70 mol % of hydrogen.

According to another aspect of the invention, a device is provided for the production of carbon dioxide and hydrogen from a gas flow comprising at least hydrogen, at least one sulfur-comprising component and carbon dioxide originating from a Claus unit fed with a gas comprising at least 50 mol % of oxygen comprising a compressor in order to compress the gas flow and a drying unit in order to dry the gas flow in order to produce a compressed and dried gas flow and a unit for separation at subambient temperature in order to separate the compressed and dried gas flow by distillation and/or by at least one stage of partial condensation at subambient temperature in order to produce at least a fluid enriched in carbon dioxide with respect to the compressed and dried gas flow and at least a fluid enriched in hydrogen with respect to the compressed and dried gas flow.

According to other optional aspects:
 the fluid enriched in hydrogen is a gas and the device comprises an adsorption unit in order to separate this gas or a gas derived from this gas by adsorption in order to produce a flow rich in hydrogen comprising at least 60 mol % of hydrogen and a flow depleted in hydrogen,
 the device comprises a second unit for separation at subambient temperature in order to treat the flow depleted in hydrogen comprising carbon dioxide in order to produce a flow rich in carbon dioxide,
 the fluid enriched in hydrogen comprises at least one sulfur-comprising component and the device comprises a unit for separation by adsorption in order to separate this fluid by adsorption in order to produce a flow depleted in at least one sulfur-comprising component,
 the device comprises a unit for separation at subambient temperature where the fluid enriched in hydrogen or a gas derived from this gas is separated by distillation and/or by at least one stage of partial condensation at a subambient temperature, optionally fed with another flow rich in hydrogen not originating from the separation at subambient temperature, the device comprises a permeation unit where the fluid enriched in hydrogen is separated by permeation in order to produce a gas rich in hydrogen and a gas comprising carbon dioxide, the device comprises means for returning the gas comprising carbon dioxide comprising at least 40% of carbon dioxide to the separation at subambient temperature, the device does not comprise means for treating the gas flow originating from the Claus unit by a stage of absorption with a solvent or by combustion with oxygen before stage a).

the device does not comprise means for treating the gas flow in order to reduce its content of sulfur-comprising compounds.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The invention will be described in more detail with reference to the figures.

The invention relates to the device and to the method for the recovery and purification of $CO_2$ and hydrogen present in the effluent stream depleted in $H_2S$ from a tail gas treatment unit (TGT unit) of a Claus unit fed with oxygen. This effluent stream typically comprises less than 1% of $H_2S$.

The use of purified oxygen at the inlet of the Claus unit and not of air, like conventional Claus units, makes it possible to obtain a stream highly enriched in $CO_2$ at the outlet of the TGT unit and to render very favorable the purification of this $CO_2$ by a subambient temperature route.

Certain embodiments of the present invention provide for the production of a stream of pure $CO_2$, for example comprising more than 99 mol % of carbon dioxide, by separation at subambient temperature of the effluent stream depleted in $H_2S$ of the TGT unit, the production of a stream enriched in hydrogen and optionally the enhancement in the economic value of the stream enriched in hydrogen in a unit other than the Claus and TGT units.

The unit for separation at low pressure makes possible the separation of a gas flow comprising hydrogen and carbon dioxide by distillation at subambient temperature, that is to say below −20° C. Alternatively or additionally, the separation can be carried out by at least one stage of condensation, followed by a separation of the liquid and gas phases formed.

A first alternative form of this invention provides for the enhancement in economic value of the stream enriched in hydrogen of the separation at subambient temperature of the present invention by sending it to the feeding of a pressure swing adsorption (PSA) unit for the production of a gas rich in hydrogen in order to make possible the recovery and the purification of this $H_2$.

A second alternative form of this invention provides for the removal, by an adsorption process, of the traces of sulfur-comprising compounds still present in the stream enriched in hydrogen produced by the separation at subambient temperature of the present invention.

A third alternative form of this invention provides for the enhancement in economic value of the stream enriched in hydrogen of the separation at subambient temperature of the present invention by sending it to a membrane separation unit wherein a stream of pure hydrogen will be produced in the permeate and a stream highly enriched in $CO_2$ will be produced in the residue. This stream highly enriched in $CO_2$ can either be enhanced in value directly or be recycled upstream of the separation at subambient temperature (and downstream of the drying unit) in order to increase the production of pure $CO_2$ of the unit for separation at subambient temperature and/or to lower the operating pressure of the unit for separation at subambient temperature while retaining the same recovery of $CO_2$.

A fourth alternative form of this invention provides for the enhancement in the economic value of the stream enriched in hydrogen of the separation at subambient temperature of the present invention to a second unit for separation at subambient temperature of the offgas from a pressure swing adsorption or PSA unit for the production of a gas rich in hydrogen in order to recover and purify the hydrogen and the $CO_2$ which are present in the stream enriched in hydrogen from the separation at ambient temperature of the present invention.

A fifth alternative form of this invention provides for the feeding of the unit for separation at subambient temperature directly with the outlet stream from the Claus unit, making it possible to dispense with the TGT unit. This stream feeding the separation at subambient temperature of the present invention will be richer in sulfur-comprising compounds. It will, for example, comprise between 1000 ppm and/or 2.5 mol % of $H_2S$ and up to 50 ppm of $CO_2$. This will have the consequence of increasing the content of sulfur-comprising compounds of the $CO_2$ produced. However, dispensing with the TGT unit will make it possible to reduce the compression costs (equivalent to the pressure drops of the TGT unit), the operating costs specific to the TGT unit (essentially steam for regenerating the amine solution) and the capital costs. The unit for drying the gas for feeding the unit for separation at subambient temperature can be placed before, midway or after the compression stage.

A sixth alternative form of the present invention provides for the presence of nitrogenous compounds in the flue gases from the Claus unit or from the Claus unit followed by a TGT feeding the separation at ambient temperature of the present invention. These nitrogenous compounds can originate from streams rich in ammonia conventionally treated in oil refinery Claus units.

A seventh alternative form of the present invention provides for the thermal integration of the unit for separation at subambient temperature of the present invention with a unit for separation at subambient temperature of sour gases (for example, a mixture of natural gas, of sulfur-comprising compounds and of $CO_2$).

The advantages of this solution are as follows:
- The recovery yield of the $CO_2$ present in the flue gases is at least 85%, depending on the $CO_2$ content of the inlet stream of the unit for separation at subambient temperature.
- The purity of the $CO_2$ produced is >99.5 mol %, which is particularly advantageous for EOR or EGR applications (i.e., minimization of the noncondensable products, which minimizes the cost of the compression, and the minimization of the impurities which can potentially react with the materials for the transportation and injection of the $CO_2$).
- Production of a stream rich in hydrogen which can be enhanced directly in economic value for its fuel value or which can be easily purified in other units (cf., alternative forms of the invention).
- The specific separation energy (kWh/ton $CO_2$) is lower by 10 to 15% than the energy of the membrane separation (on the basis of a recovery of 80% of the $CO_2$ without recycling of the permeate to the furnace).
- The specific capital cost (k€/ton $CO_2$) is lower by 5 to 10% than that of the membrane separation (on the basis of a recovery of 80% without recycling of the permeate to the furnace).

FIGS. 1 to 6 represent processes and devices according to the invention.

Figure 1:
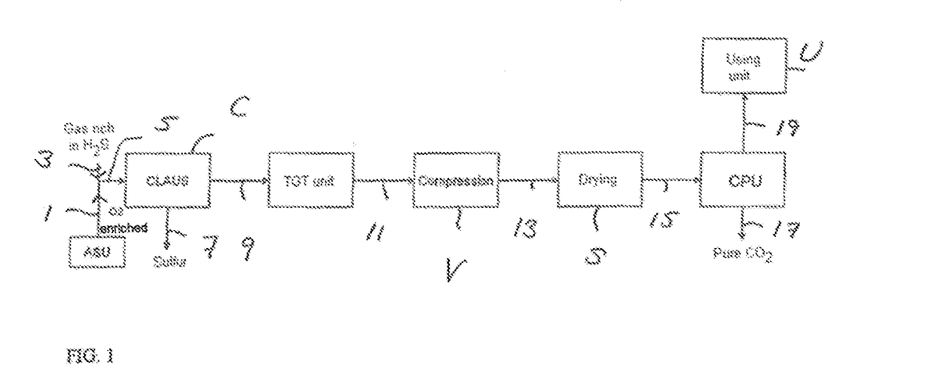
FIG. 1 represents a process flow diagram in accordance with an embodiment of the present invention.

In FIG. 1, an air separation device ASU produces a gas 1 comprising between 50 and 99.8 mol % of oxygen which feeds a Claus unit C. This Claus unit C is also fed with a gas 3 rich in $H_2S$ and $CO_2$. The gases and 3 can be mixed in order to form a gas 5. The Claus unit produces sulfur 7 and an offgas 9 comprising $CO_2$, CO, $H_2S$, $H_2O$, $H_2$, Ar mainly which is optionally sent to a TGT unit in order to produce a gas 11 enriched in carbon dioxide and a gas enriched in $H_2S$.

Either the offgas 9 from the Claus unit C or the gas 11 derived from this offgas, subsequent to a treatment in the TGT unit, is compressed in a compressor V in order to form a gas 13 at a pressure of at least 6 bars abs, preferably at least 20 bars abs. After or during the compressing, the gas is dried. Subsequently, the dried gas 15 comprising at least 50 mol % of $CO_2$ and at least 5 mol % of hydrogen is cooled to a temperature of less than −50° C. and is sent to a stage of separation at subambient temperature in the CP unit. This separation can comprise at least one distillation stage. It can also comprise at least one stage of condensation followed by separation in a phase separator. This separation at subambient temperature produces a gas rich in carbon dioxide 17 comprising at least 99.5 mol % of $CO_2$ and a gas rich in hydrogen 19 comprising at least 50 mol % of hydrogen. The gas 19 is subsequently to a unit U which uses and/or treats this gas 19.

Figure 2:
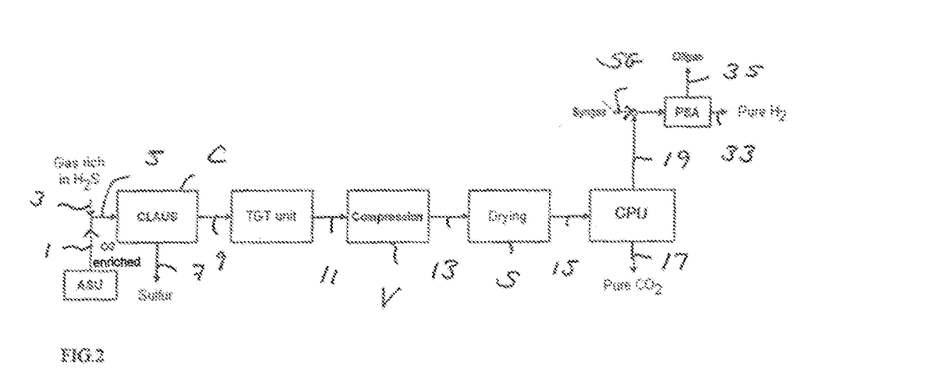
FIG. 2 represents a process flow diagram in accordance with an embodiment of the present invention.

The process of FIG. 2 comprises all the characteristics of FIG. 1. In this case, the unit U provides for the enhancement in economic value of the stream enriched in hydrogen 19 from the separation at subambient temperature of the present invention. This stream is sent to the feeding of a hydrogen PSA in order to make possible the purification and the recovery of this $H_2$. The adsorption unit of $H_2$ PSA type can also be fed with a flow of synthesis gas SG comprising, as main components, hydrogen and carbon dioxide. This makes it possible to produce pure hydrogen 33 and an offgas 35. For example, a synthesis gas SG comprising 19 mol % of $CO_2$, 75% of hydrogen and 6% of methane at 31 bar might be mixed with a gas 19 comprising 14% of $CO_2$, 10% of argon, 73% of hydrogen and 2% of CO at 52 bar. This would make it possible to produce hydrogen 33 comprising more than 99.6% and an offgas 35 comprising 55% of $CO_2$, 26% of hydrogen and 17% of methane.

Figure 3:
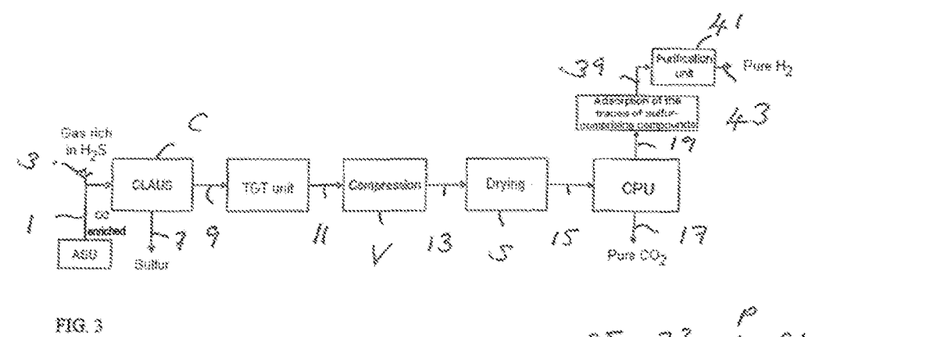
FIG. 3 represents a process flow diagram in accordance with an embodiment of the present invention.

The process of FIG. 3 comprises all the elements of FIG. 1 and in addition provides for the removal, by an adsorption process, of the traces of sulfur-comprising compounds still present in the stream enriched in hydrogen from the separation at subambient temperature of the present invention. The gas rich in hydrogen 19 originating from the separation at subambient temperature is sent to the unit for adsorption 37 of the traces of sulfur-comprising compounds and subsequently to a PSA unit in order to produce a gas enriched in hydrogen 33 and an offgas 35. For example, the gas 19 comprising 100 ppm of $H_2S$ and 50 ppm of COS can be purified in the unit 37 by adsorption on a guard bed in order to reduce the content of these impurities to substantially zero (below the ppm level).

This figure can be combined with FIG. 2 in order for the gas rich in hydrogen to be treated by adsorption of sulfur-comprising compounds upstream of the PSA for the adsorption of hydrogen.

Figure 4:
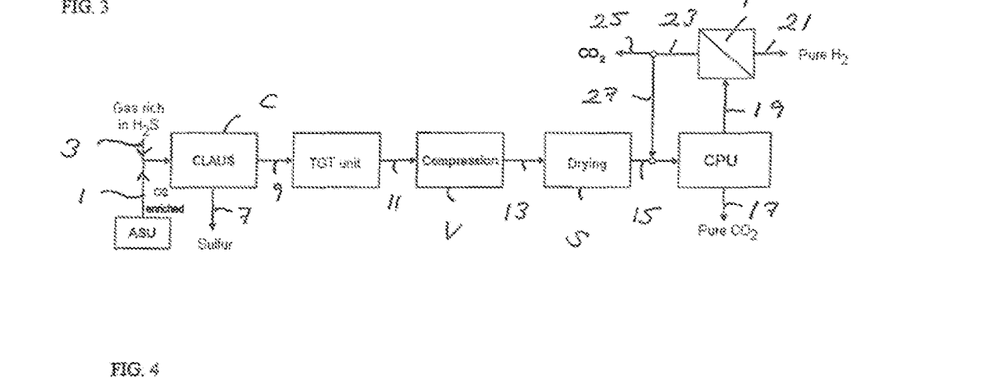
FIG. 4 represents a process flow diagram in accordance with an embodiment of the present invention.

In FIG. 4, provision is made for the enhancement in economic value of the stream 19 enriched in hydrogen from the separation at subambient temperature of the present invention to a membrane separation unit P where a stream of pure hydrogen 21 will be produced in the permeate and a stream highly enriched in $CO_2$ 23 will be produced in the residue. This stream highly enriched in $CO_2$ can either be directly made use of economically as gas 25 or be recycled as gas 27 upstream of the separation at subambient temperature (and downstream of the drying unit) in order to increase the production of pure $CO_2$ of the separation at subambient temperature in the CPU unit and/or to lower the operating pressure of the unit for separation at subambient temperature while retaining the same recovery of $CO_2$. For example, the gas 19 can comprise 14% of $CO_2$, 10% of argon, 2% of CO and 73% of hydrogen at 52 bar. The permeation in the unit P produces a permeate 21 of 91% of hydrogen, 1% of argon and 8% of $CO_2$, the nonpermeate 23 comprises 42% of $CO_2$, 45% of argon, 2% of hydrogen and 9% of CO at 51 bar.

Figure 5:
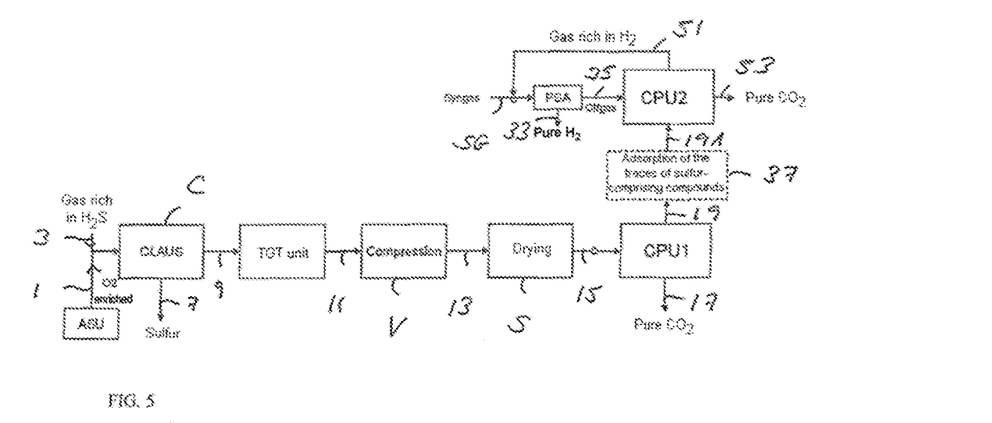
FIG. 5 represents a process flow diagram in accordance with an embodiment of the present invention.

FIG. 5 provides for the enhancement in economic value of the stream enriched in hydrogen from the separation at subambient temperature of the present invention to another unit for separation at subambient temperature CPU 2. This second unit for separation at subambient temperature is also fed with offgas 35 from a hydrogen PSA (Cryocap™ $H_2$ process) in order to recover and purify the hydrogen and the $CO_2$ which are present in the stream enriched in hydrogen 19 from the separation at subambient temperature of the present invention. The second unit for separation at subambient temperature CPU 2 produces pure $CO_2$ and also a gas 51 rich in hydrogen. The gas 51 is mixed with synthesis gas SG which feeds a hydrogen PSA. The hydrogen PSA produces a gas rich in hydrogen 33 and an offgas 35.

The recovery of the $CO_2$ from the Claus/TGT unit is thus close to 100%. The stream enriched in hydrogen 19 originating from the unit for separation at subambient temperature of the present invention can be purified of sulfur-comprising components in order to produce a gas 19A before being sent to the unit for separation at subambient temperature of the offgas from a hydrogen PSA.

Alternatively, the gas 19 or 19A can be sent to the inlet of the hydrogen PSA which receives, as other feed gas, a synthesis gas SG. In this case, the gas 19 or 19A does not feed the second unit CPU 2 directly. Only the offgas 35 from the hydrogen PSA feeds the second unit CPU 2.

The second unit CPU 2 can carry out a separation by permeation of the feed gas and/or of a product from the separation at subambient temperature.

The gas 19 comprises 14% of $CO_2$, 73% of hydrogen, 10% of argon and 2% of CO. The gas 33 comprises 20% of carbon dioxide, 67% of hydrogen, 11% of methane and 2% of carbon monoxide. The offgas 35 comprises 25% of hydrogen, 18% of methane, 54% of carbon dioxide, 2% of CO and 1% of nitrogen.

Figure 6:
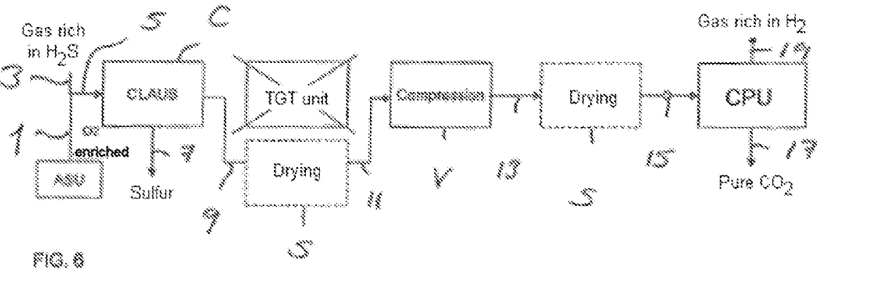
FIG. 6 represents a process flow diagram in accordance with an embodiment of the present invention.

FIG. 6 provides for the feeding of the unit for separation at subambient temperature CPU directly with the outlet stream from the Claus unit C, making it possible to dispense with the TGT unit. This stream feeding the separation at subambient temperature of the present invention will be richer in sulfur-comprising compounds, which will have the consequence of increasing the content of sulfur-comprising compounds of the product $CO_2$. However, dispensing with the TGT unit will make it possible to reduce the costs of compression (equivalent to the pressure drops of the TGT unit), the operating costs specific to the TGT unit (essentially steam for regenerating the amine solution) and the capital costs. The unit for drying S (in dotted lines) a feed gas of the unit for separation at subambient temperature can be placed before or after the compression stage or stages V. Otherwise, it can take place between two compression stages. The gas 15 thus constitutes an effluent stream from the Claus process which has been compressed and dried but which has not been treated by absorption by a solvent in order to remove the sulfur-comprising components. Likewise, it has not been treated by combustion with oxygen. The gas 15 entering the unit for separation at subambient temperature thus comprises all the sulfur-comprising impurities which there were at the outlet of the Claus unit C, for example 2.5% of $H_2S$ and 50 ppm of COS. The gas 15 comprises 67% of carbon dioxide, 26% of hydrogen, 3.5% of argon and 1% of CO. The presence of $H_2S$ and/or COS is not a nuisance in the unit for separation at subambient temperature. The carbon dioxide produced 17 will comprise, in addition to the 97% of $CO_2$, 3% of $H_2S$ and 80 ppm of $CO_2$, while the gas 19 will comprise only 0.4% of $H_2S$ and virtually no COS, with 73.6% of hydrogen. The use of the CPU thus makes it possible to sequester not only the $CO_2$ but thus the sulfur-comprising impurities. The presence of these impurities is not troublesome for certain applications, for example EOR.

The presence of nitrogenous compounds in the flue gases form the Claus/TGT unit feeding the separation at subambient temperature of the present invention can be envisaged. These nitrogenous compounds can originate from streams rich in ammonia conventionally treated in oil refinery Claus units.

The thermal integration of the unit for separation at subambient temperature of the present invention with another unit for separation at subambient temperature of sour gases (mixture, nonlimiting, of natural gas, of sulfur-comprising compounds and of $CO_2$) can be envisaged. The other unit can be a unit for separation of natural gas, of $H_2S$ and of $CO_2$ by distillation at subambient temperature. The temperature level is close to the temperatures of the process for the distillation of carbon dioxide, which may make possible thermal integrations between the two processes and may contribute savings in energy consumption of the overall line for the treatment of natural gas.

Dispensing with the TGT unit may be envisaged also in all the cases described, including for all FIGS. 1 to 5.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for the production of carbon dioxide and hydrogen from a gas flow comprising at least hydrogen, at least one sulfur-comprising component and carbon dioxide originating from a Claus unit (C) in which hydrogen sulfide ($H_2S$) is partially converted into sulfur, the Claus unit being fed with a gas comprising at least 50 mol % of oxygen and produces a gas flow, in which the process further comprises the steps of:
   a) compressing and drying the gas flow in order to produce a compressed and dried gas flow; and
   b) separating the compressed and dried gas flow by distillation and/or by at least one stage of partial condensation at a subambient temperature, in order to produce at least a fluid enriched in carbon dioxide with respect to the compressed and dried gas flow and at least a fluid enriched in hydrogen with respect to the compressed and dried gas flow,
   wherein the gas flow originates directly from the Claus unit, without having been treated in order to reduce its content of sulfur-comprising compounds.

2. The process as claimed in claim 1, wherein the fluid enriched in hydrogen is a gas and this gas or a gas derived from this gas is separated by adsorption in order to produce a flow rich in hydrogen comprising at least 60 mol % of hydrogen and a flow depleted in hydrogen.

3. The process as claimed in claim 2, wherein the flow depleted in hydrogen comprises carbon dioxide and is treated by separation at subambient temperature in order to produce a flow rich in carbon dioxide.

4. The process as claimed in claim 1, wherein the fluid enriched in hydrogen comprises at least one sulfur-comprising component and is separated by adsorption in order to produce a flow depleted in at least one sulfur-comprising component.

5. The process as claimed in claim 1, wherein the fluid enriched in hydrogen or a gas derived from this gas is separated by distillation and/or by at least one stage of partial condensation at a subambient temperature, optionally fed with another flow rich in hydrogen not originating from the separation at subambient temperature.

6. The process as claimed in claim 1, wherein the fluid enriched in hydrogen is separated by permeation in order to produce a gas rich in hydrogen and a gas comprising carbon dioxide, and optionally the gas comprising carbon dioxide comprises at least 40% of carbon dioxide and is returned to the separation at subambient temperature.

7. The process as claimed in claim 1, wherein the gas flow originating from the Claus unit is not treated by a stage of absorption with a solvent or by combustion with oxygen before stage a).

8. The process as claimed in claim 1, wherein the stage of separation at subambient temperature is thermally integrated with a process for the treatment of a fluid comprising a stage at subambient temperature, the treatment process being intended to produce a fluid intended for the Claus unit.

9. A device for the production of carbon dioxide and hydrogen from a gas flow comprising at least hydrogen, at least one sulfur-comprising component and carbon dioxide originating from a Claus unit fed with a gas comprising at least 50 mol % of oxygen, the device comprising:
    a compressor configured to compress the gas flow;
    a drying unit configured to dry the gas flow in order to produce a compressed and dried gas flow; and
    a subambient separation unit configured to separate the compressed and dried gas flow by distillation and/or by at least one stage of partial condensation at subambient temperature in order to produce at least a fluid enriched in carbon dioxide with respect to the compressed and dried gas flow and at least a fluid enriched in hydrogen with respect to the compressed and dried gas flow,
    wherein the compressor is in direct fluid communication with the Claus unit, such that the compressor is configured to receive the gas flow originating directly from the Claus unit without having been treated in order to reduce its content of sulfur-comprising compounds.

10. The device as claimed in claim 9, wherein the fluid enriched in hydrogen is a gas and the device comprises an adsorption unit in order to separate this gas or a gas derived from this gas by adsorption in order to produce a flow rich in hydrogen comprising at least 60 mol % of hydrogen and a flow depleted in hydrogen.

11. The device as claimed in claim 10, comprising a second unit for separation at subambient temperature in order to treat the flow depleted in hydrogen comprising carbon dioxide in order to produce a flow rich in carbon dioxide.

12. The device as claimed in claim 9, wherein the fluid enriched in hydrogen comprises at least one sulfur-comprising component and the device comprises a unit for separation by adsorption in order to separate this fluid by adsorption in order to produce a flow depleted in at least one sulfur-comprising component.

13. The device as claimed in claim 9, comprising a unit for separation at subambient temperature where the fluid enriched in hydrogen or a gas derived from this gas is separated by distillation and/or by at least one stage of partial condensation at a subambient temperature, optionally fed with another flow rich in hydrogen not originating from the separation at subambient temperature.

14. The device as claimed in claim 9, comprising means for returning the fluid enriched in carbon dioxide with respect to the compressed and dried gas flow to the separation at subambient temperature.

* * * * *